Patented July 13, 1943

2,324,101

UNITED STATES PATENT OFFICE 2,324,101

STABILIZATION OF UNSATURATED KETONES

Edward M. McMahon, Kingsport, Tenn., assignor to Eastman Kodak Company, Rochester, N. Y., a corporation of New Jersey No Drawing. Application May 14, 1941, Serial No. 393,417

5 Claims. (Cl. 260—593)

This invention concerns the stabilization against polymerization of unsaturated ketones particularly those having one saturated alkyl group and one unsaturated hydrocarbon group.

Methyl vinyl ketone is difficult to preserve in its monomeric state, the tendency to polymerize being so great that it is sometimes partially polymerized when isolated, so that the product is already viscous. It is sensitive to light and heat and on standing under ordinary conditions of light and temperature, polymerization will usually occur within one or two days. Storage in the dark is no guaranty of preservation of the monomer, for ordinarily within a period of 2 weeks, methyl vinyl ketone stored in the dark at room temperature polymerizes to a firm gel.

Methyl isopropenyl ketone does not polymerize as rapidly as methyl vinyl ketone, but the rate of polymerization thereof is enough that storage of this ketone without inhibiting polymerization is not practicable. Although certain organic compounds have been employed for stabilizing polymerizable compounds, no case is known where inorganic materials have been employed for this purpose.

An object of this invention is to provide a method of stabilizing polymerizable unsaturated ketones against polymerization by means of inorganic materials. Other objects of this invention will appear herein.

I have found that polymerizable unsaturated ketones may be stabilized against polymerization by adding thereto a small proportion of one or more of the following inorganic materials; potassium iodide, freshly reduced copper, cuprous oxide, stannous chloride and lead acetate. I have found that compositions of unsaturated ketones and one of these inorganic reducing agents may be allowed to stand under ordinary room conditions without any appreciable increase of viscosity. If polymerization were taking place an increase of viscosity would be evidenced upon standing for a few days.

The inorganic reducing material which inhibits the polymerization of the unsaturated ketone may be employed in a proportion of .005 to .05 part of the inorganic reducing material per part of unsaturated ketone. The proportion to be employed within the range given will depend on the judgment of the individual operator, more severe storage conditions making the use of proportions of inhibitor in the higher portion of the range, desirable.

Not only is this invention applicable to stabilizing methyl vinyl ketone and methyl isopropenyl ketone but is is also applicable to stabilizing any ketone which by virtue of the presence of unsaturated groups is susceptible to polymerization upon standing without the addition of an inhibiting material thereto.

The following examples illustrate the beneficial effect of using the inhibiting agents of this invention.

*Example I*

5 c. c. samples of methyl vinyl ketone as designated were allowed to stand for the times indicated below under ordinary room conditions, 0.1 g. of the designated inhibitor being added except to the first sample. An evident increase of viscosity was interpreted as meaning that polymerization took place. The maintenance of a limpid condition was taken as meaning that the polymerization was inhibited.

|  | Day standing | | | | |
|---|---|---|---|---|---|
|  | 2 | 16 | 20 | 30 | 60 |
| Methyl vinyl ketone alone | Solid gel | | | | |
| Methyl vinyl ketone: | | | | | |
| +KI | Limpid | Limpid | Limpid | Limpid | Limpid. |
| +Freshly reduced Cu | do | do | do | do | Do. |
| +Cu₂O | do | do | do | do | Do. |
| +SnCl₂ | do | do | do | do | Do. |
| +Pb(OAc)₂ | do | do | do | do | Do. |

*Example II*

The previous example was repeated except that methyl isopropenyl ketone was used instead of methyl vinyl ketone. The results were as follows:

|  | Days standing | | |
|---|---|---|---|
|  | 6 | 9 | 53 |
| Methyl isopropenyl ketone alone | Viscous | Solid | |
| Methyl isopropenyl ketone: | | | |
| +KI | Limpid | Limpid | Limpid. |
| +freshly reduced Cu | do | do | Do. |
| +Cu₂O | do | do | Do. |
| +SnCl₂ | do | do | Do. |
| +Pb(OAc)₂ | do | do | Do. |

By using inorganic reducing material for stabilizing unsaturated ketones in accordance with this invention, the ketone may readily be distilled when desired without any danger of contamination from the inhibiting materials. Any color which has been imparted to the ketones by these inhibiting materials such as by the copper or the copper oxide is easily and completely removed by the distillation of the ketone.

I claim:

1. A composition of matter comprising one part of a polymerizable ketone and .02 part of potassium iodide.

2. A composition of matter comprising one part of a polymerizable ketone and .005–.05 part of potassium iodide.

3. A composition of matter comprising one part of methyl vinyl ketone and .005–.05 part of potassium iodide.

4. A composition of matter comprising one part of methyl isopropionyl ketone and .005–.05 part of potassium iodide.

5. A composition of matter comprising one part of methyl vinyl ketone and .02 part of potassium iodide.

EDWARD M. McMAHON.